(12) United States Patent
Jackson

(10) Patent No.: US 6,576,128 B1
(45) Date of Patent: Jun. 10, 2003

(54) MAGNET ASSEMBLY FOR REMOVING FERROUS METAL PARTICLES FROM FLUIDS

(76) Inventor: Otto V. Jackson, 745 Aurora Lake Rd., Aurora, OH (US) 44202

( * ) Notice: Subject to any disclaimer, the term of this patent is extended or adjusted under 35 U.S.C. 154(b) by 6 days.

(21) Appl. No.: 09/976,081

(22) Filed: Oct. 12, 2001

(51) Int. Cl.[7] .............................................. B01D 35/06
(52) U.S. Cl. ...................... 210/223; 210/222; 184/6.25; 335/304
(58) Field of Search ................................ 210/222, 223; 184/6.25; 335/304

(56) References Cited

U.S. PATENT DOCUMENTS

| | | | |
|---|---|---|---|
| 3,480,145 A | * 11/1969 | Gladden | .................. 210/223 |
| 5,282,963 A | 2/1994 | Hull et al. | |
| 5,510,024 A | 4/1996 | Caiozza | |
| 5,556,540 A | * 9/1996 | Brunsting | .................. 210/223 |
| 5,571,411 A | 11/1996 | Butler et al. | |
| 5,702,598 A | * 12/1997 | Lemon et al. | .................. 210/223 |

* cited by examiner

Primary Examiner—David A. Reifsnyder
(74) Attorney, Agent, or Firm—Renner, Otto, Boisselle & Sklar, LLP

(57) ABSTRACT

A magnet assembly includes a ring shaped magnet having a face with an inner surface that is removably attachable to a ferrous metal housing of a fluid filter. The face has a plurality of circumferentially spaced pairs of poles that concentrate the magnetic strength of the magnet on the face and form magnetic loops in the filter housing to cause any ferrous metal particles in the fluid being circulated through the filter housing to be trapped against interior walls of the filter housing.

21 Claims, 2 Drawing Sheets

MAGNET ASSEMBLY FOR REMOVING FERROUS METAL PARTICLES FROM FLUIDS

FIELD OF THE INVENTION

This invention relates to a magnet assembly for removing ferrous metal particles from fluids including particularly engine oil and hydraulic fluids.

BACKGROUND OF THE INVENTION

There are numerous filters on the market that are effective in keeping lubricating fluids such as engine oil for gasoline and diesel engines and hydraulic fluids used to drive various machinery free of most contaminants. However, many harmful ferrous metal particles of minute size are produced through normal wear that are not effectively removed by most filters. When the minute ferrous metal particles are allowed to flow freely through a lubrication or hydraulic fluid system, they will actually create more wear and more harmful ferrous metal particles.

In the past, numerous attempts have been made to use magnetic devices of various types to trap ferrous metal particles in a filter with varying degrees of success. However, there continues to be a need for a magnet assembly that is more effective in removing minute ferrous metal particles circulating through lubricating or hydraulic fluid filters.

SUMMARY OF THE INVENTION

The magnet assembly of the present invention is capable of removing virtually all minute ferrous metal particles that might otherwise freely circulate through lubricating or hydraulic fluid systems.

In accordance with one aspect of the invention, the magnet assembly includes a high strength disc shaped magnet that concentrates the magnetic strength on the face of the magnet giving the magnet a much higher magnetic face strength.

In accordance with another aspect of the invention, the high magnetic face strength of the magnet of the present invention forms magnetic loops in the ferrous metal walls of a fluid filter housing to cause the filter walls to collect and hold any ferrous metal particles in the fluid being circulated through the filter.

In accordance with another aspect of the invention, the inner surface of the magnet face has a conical taper that generally conforms to a rounded concave contour of the outer end wall of most canister type filter housings.

In accordance with another aspect of the invention, the magnet has a center hole to provide an opening for receipt of a nut on the outer end of some filters.

In accordance with another aspect of the invention, the magnet is contained within a cup-shaped plastic housing that provides some protection against breakage in the event that the magnet assembly is inadvertently dropped against a hard surface. Also, the housing covers the outer end of the magnet center hole preventing debris from entering the magnet assembly from the outside.

In accordance with another aspect of the invention, a ferrous metal disc may be placed in close proximity to the outer surface of the magnet face to aid in focusing the magnetic flux on the magnet face.

In accordance with another aspect of the invention, a friction pad may be interposed between the magnet assembly and outer end wall of the filter housing to prevent the magnet assembly from sliding sideways relative to the filter housing when the filter is mounted horizontally and is subject to high vibration while still permitting the magnet assembly to be peeled off the filter and reused over and over whenever the fluid is changed and the filter is replaced.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
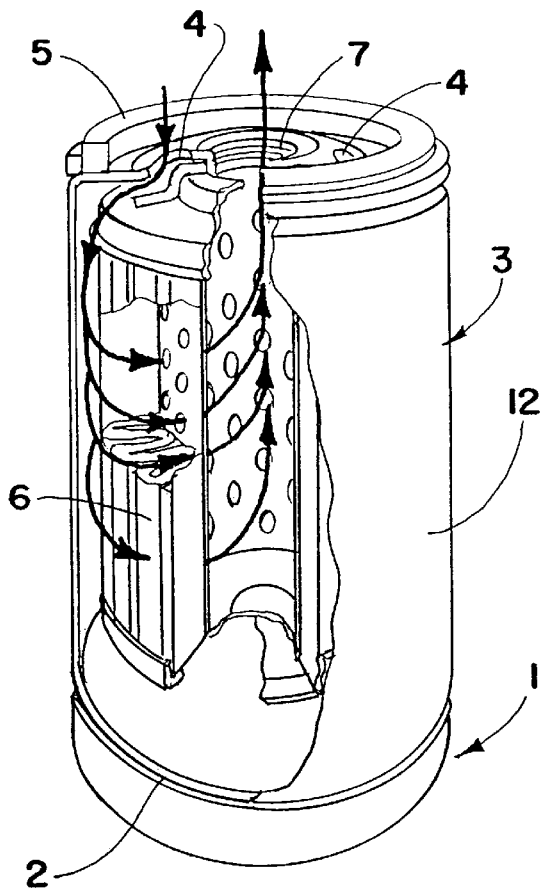
FIG. 1 is a schematic perspective view partially broken away showing one form of magnet assembly in accordance with the present invention attached to the outer end wall of a conventional canister type oil filter.

Referring now in detail to the drawings, and initially to FIG. 1, there is shown one form of magnet assembly 1 in accordance with this invention attached to the outer end wall 2 of a canister type filter 3 commonly used for example to filter the lubricating oil of gasoline or diesel engines used to power automobiles, trucks, motorcycles, etc. The oil enters the filter 3 through a series of circumferentially spaced openings 4 at the inner end 5 of the filter and then passes through a suitable filter medium 6 before exiting the filter through a central discharge opening 7 as schematically shown in FIG. 1. Such filters are effective in removing most contaminants from the fluid circulating through the filters, but not the minute ferrous metal particles that are produced through normal wear of such engine parts as piston rings, cylinder walls, bearing riding surfaces, etc. The magnet assembly 1 of the present invention will remove virtually all of these minute ferrous metal particles in the fluid by forming magnetic loops in the filter housing causing the filter housing to collect and hold the ferrous metal particles as described hereafter.

Figure 2:
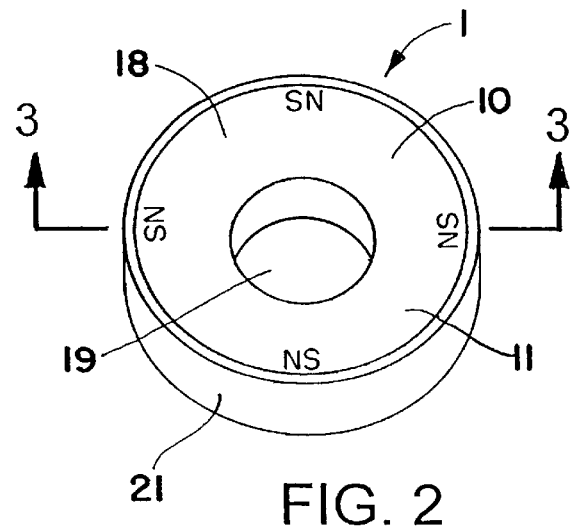
FIG. 2 is a schematic perspective view of the magnet assembly of FIG. 1.
Figure 3:
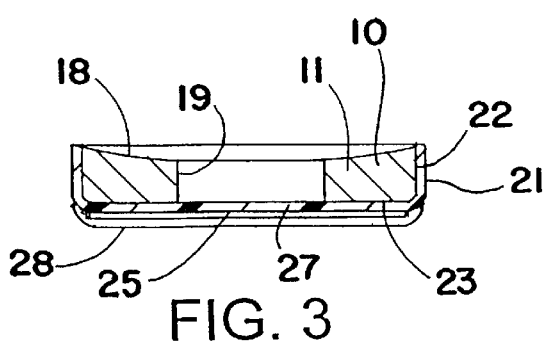
FIG. 3 is a vertical section through the magnet assembly of FIG. 2, taken generally along the plane of the line 3—3 thereof.

Referring now to FIGS. 2 and 3, magnet assembly 1 comprises a high strength magnet 10 made out of a slurry of various metals including for example neodymium iron boron. Magnet 10 is produced in a compression mold that forms the magnet into the desired disc shape. Once formed, the magnet is magnetized to provide a plurality of circumferentially spaced pairs of poles N and S on the face 11 of the magnet. In the embodiment disclosed herein, four uniformly spaced pairs of poles are provided around the face 11 of the magnet 10. However, it will be appreciated that fewer or more pairs of poles may be provided depending on the required size and strength of the magnet.

Figure 6:
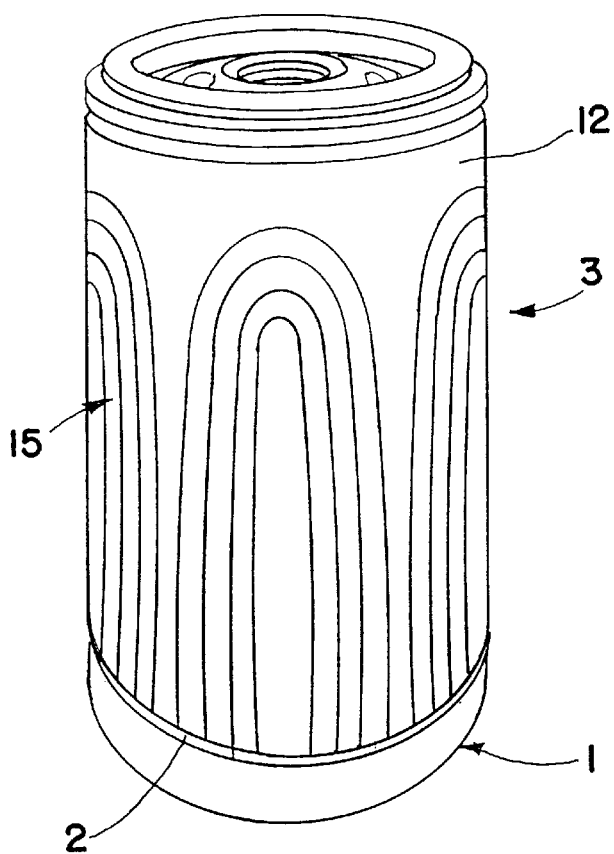
FIG. 6 is a schematic perspective view showing how the concentration of magnetic fields on the face of the magnet of the present invention are focused directly to the filter housing and form magnetic loops therein that collect and hold ferrous metal particles against the interior walls of the filter housing.

Providing plural pairs or sets of circumferentially spaced poles on the magnet face 11 concentrate the magnetic strength on the magnet face. The magnetic fields between the poles are relatively short and are focused directly on the ferrous metal filter housing 12 to form magnetic loops 15 in the walls of the filter housing when the magnet assembly 1 is attached to the outer end wall 2 of the filter as schematically shown in FIG. 6. These magnetic loops 15 in the filter housing 12 will attract and trap virtually all ferrous metal particles in the fluid circulating through the filter against the inside walls of the filter housing.

The inner side 18 of the magnet face 11 that engages the outer end wall 2 of the filter housing 12 may be provided with a 10° conical taper to generally conform to the concave rounded outer contour of most filter end walls. Also, a hole 19 is provided through the center of the magnet of a size for receipt of a nut 20 on the outer end of some filters as schematically shown in FIG. 7.

Figure 7:
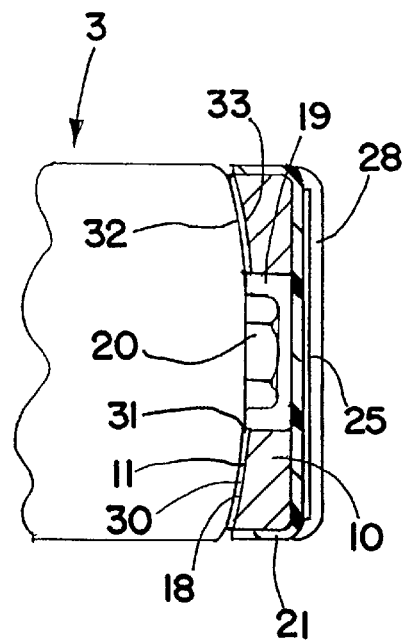
FIG. 7 is a side elevation view, partly in section, showing a magnet assembly of the present invention attached to the outer end wall of a horizontally oriented filter.
Figure 4:
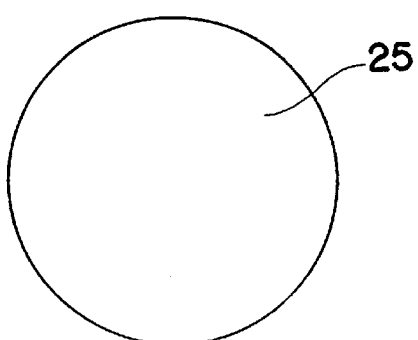
FIG. 4 is a top plan view of a flux concentration disc that is attached to the outer side of the magnet face.
Figure 5:
FIG. 5 is a side elevation view of the flux concentration disc of FIG. 4.

The magnet 10 is contained within a cup-shaped plastic housing 21 that completely covers the outer edge 22 and outer side 23 of the magnet face 11 as schematically shown in FIGS. 3 and 7 to provide some protection to the magnet against breakage in the event the magnet assembly is inadvertently dropped on a hard surface, and to cover the outer end of the center opening 19 in the magnet to prevent debris from entering the opening from the exterior. Also a ferrous metal disc 25 that may be electroplated with tin may be positioned against the outer surface of the end wall 27 of the plastic housing 21 in close proximity to the outer side 23 of the magnet face 11 as schematically shown in FIGS. 3 and 7. Metal disc 25 (which is shown by itself in FIGS. 4 and 5) aids in focusing the magnetic flux on the magnet face 11 which forms the magnetic loops on the walls of the filter housing as previously described.

The magnetic force of the magnet 10 is sufficient to hold the metal disc 25 in place against the end wall 27 of the plastic housing 21. However, a suitable adhesive may be used to permanently secure the metal disc 25 to the plastic housing end wall 27 if desired. Also, a decal 28 or the like made of a suitable material such as plastic or paper may be adhesively secured to the outer surface of the metal disc 25 to cover the metal disc as further shown in FIGS. 3 and 7.

Figure 8:
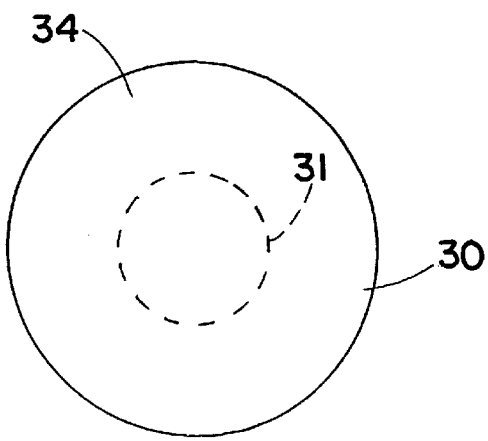
FIG. 8 is a top plan view of a friction pad that may optionally be used to increase the friction between the outer end wall of the filter housing and magnet when the filter housing is oriented horizontally as shown in FIG. 7.
Figure 9:
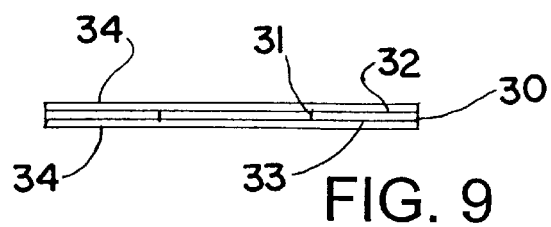
FIG. 9 is a side elevation view of the friction pad of FIG. 8.

To install the magnet assembly 1, the inner side 18 of the magnet face 11 is simply placed against the outer end wall 2 of the filter housing 12 as schematically shown in FIGS. 1, 6 and 7. The magnetic force of the magnet acting on the filter housing 12 is sufficient to hold the magnet assembly in place against the filter. However, if the filter is mounted horizontally as shown in FIG. 7 and is subject to high vibration, a friction pad 30 (shown by itself in FIGS. 8 and 9) may be placed between the magnet assembly 1 and filter end wall 2 to guard against the possibility of the magnet assembly sliding sideways on the filter housing. Friction pad 30 may be made out of a suitable plastic tape, and is in the shape of a ring with a center hole 31 similar to the shape of the magnet face 11. One side 32 of friction pad 30 is coated with an aggressive pressure sensitive adhesive for secure attachment to the outer end wall 2 of the filter housing 12. The other side 33 of the friction pad 30 is desirably coated with a less aggressive pressure sensitive adhesive to provide just enough frictional resistance with the inner side 18 of the magnet face 11 to prevent the magnet assembly from sliding sideways relative to the filter housing end wall, while still permitting the magnet assembly to be peeled off the filter and reused over and over with a new filter whenever the lubricating fluid is changed and the filter is replaced. Removable protective sheets 34 or the like may be used to cover both sides of the friction pad 30 as shown in FIGS. 8 and 9 to protect the friction pad from adhering to a surface until the protective sheets are removed.

Although the dimensions of the magnet may vary, in one embodiment of the invention, the magnet has an outer diameter of approximately 2.85 inches so that it will readily fit most standard oil filters having a diameter of between 2 inches and 6 inches. Also, the magnet has a thickness at its outer edge of approximately ½ inch, and a center hole diameter of approximately 1 inch. Moreover, the plastic housing 21 has a wall thickness of approximately 0.070 inch and the flux concentration disc 25 has a thickness of approximately 0.030 inch.

From the foregoing, it will be appreciated that the magnet assembly of the present invention, when used with an oil filter for an engine, will extend engine life and allow the engine to produce peak power over a longer period of time by removing virtually all of the ferrous metal particles in the oil. Also, the magnet assembly may be used to remove ferrous metal particles from fluid circulating through other types of filters as well including for example hydraulic fluid return line filters and the like.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein exemplary embodiments of the invention. In addition, while a particular feature of the invention may have been disclosed with respect to only one embodiment, such feature may be combined with one or more other features of other embodiments as may be desired and advantageous for any given or particular application.

What is claimed is:

1. A magnet assembly for use with a filter having a ferrous metal housing for removing ferrous metal particles from a fluid circulating through the filter comprising a disc shaped magnet having a face, a plurality of circumferentially spaced pairs of poles on said face that concentrate the magnetic strength of the magnet on said face for focusing on the filter housing when the magnet is attached to the filter housing causing the ferrous metal particles in the fluid to be trapped against interior walls of the filter housing, said magnet face having inner and outer sides and an outer edge, and a cup-shaped plastic housing protectively covering said outer side and said outer edge of said magnet face, said magnet having a center opening extending through said face for receipt of a nut on the filter, said plastic housing covering said opening adjacent said outer side of said magnet face.

2. The magnet assembly of claim 1 further comprising a ferrous metal disc attached to said outer side of said magnet face exteriorly of said plastic housing that aids in focusing magnetic flux on said magnet face.

3. The magnet assembly of claim 2 further comprising a cover overlying said ferrous metal disc.

4. The magnet assembly of claim 3 wherein said cover comprises a plastic decal.

5. A magnet assembly for use with a filter having a ferrous metal housing for removing ferrous metal particles from a fluid circulating through the filter comprising a disc shaped magnet having a face, a plurality of circumferentially spaced pairs of poles on said face that concentrate the magnetic strength of the magnet on said face for focusing on the filter housing when the magnet is attached to the filter housing causing the ferrous metal particles in the fluid to be trapped against interior walls of the filter housing, said magnetic face having an inner side that is engageable with the filter housing, and a friction pad insertable between said inner side of said magnet face and an outer end wall of the filter housing, said friction pad having one side coated with an aggressive pressure sensitive adhesive for secure attachment to the outer end wall of the filter housing and another side coated with a less aggressive pressure sensitive adhesive for engagement by said inner side of said magnet face to resist sideways sliding movement of said magnet assembly on the filter housing while still permitting said magnet assembly to be pulled off the filter housing and reused with another filter.

6. In combination, a filter having a ferrous metal housing through which a fluid is circulated and a magnet assembly removably attached to said housing, said magnet assembly comprising a disc shaped magnet having a face, and a plurality of circumferentially spaced pairs of poles on said face that concentrate the magnetic strength of said magnet on said face and form magnetic loops in said filter housing to cause any ferrous metal particles in the fluid being circulated through said filter housing to be trapped against interior walls of said filter housing, said magnet having a center opening extending through said magnet face, and said filter housing having a nut that is received in said center opening.

7. In combination, a filter having a ferrous metal housing through which a fluid is circulated and a magnet assembly removably attached to said housing, said magnet assembly comprising a disc shaped magnet having a face, and a plurality of circumferentially spaced pairs of poles on said face that concentrate the magnetic strength of said magnet on said face and form magnetic loops in said filter housing to cause any ferrous metal particles in the fluid being circulated through said filter housing to be trapped against interior walls of said filter housing, said magnet face having inner and outer sides and an outer edge, a cup-shaped plastic housing covering said outer side and said outer edge of said magnet face, and a ferrous metal disc attached to said outer side of said magnet face exteriorly of said plastic housing that aids in focusing magnetic flux of said magnet on said magnet face.

8. A magnet assembly for use with a filter having a ferrous metal housing for removing ferrous metal particles from a fluid circulating through the filter comprising a disc shaped magnet having a magnet face, said magnet face having inner and outer sides and an outer edge, a plurality of circumferentially spaced pairs of poles on said magnet face that concentrate the magnetic strength of the magnet on said magnet face for focusing on the filter housing when said inner side of said magnet face is attached to an outer end wall of the filter housing causing the ferrous metal particles in the fluid to be trapped against interior walls of the filter housing.

9. The magnet assembly of claim 8 wherein said inner side of said magnet face is shaped to conform to the outer end wall of the filter housing to provide increased surface contact therebetween.

10. The magnet assembly of claim 8 wherein said inner side of said magnet face has a conical tapered contour to provide increased surface contact with a similarly contoured outer end wall of the filter housing.

11. The magnet assembly of claim 10 wherein said inner side of said magnet face has a 10° conical taper.

12. The magnet assembly of claim 8 wherein said inner side of said magnet face is engageable with the outer end wall of the filter housing, and a ferrous metal disc is attached to said outer side of said magnet face that aids in focusing magnetic flux of the magnet on said magnet face.

13. The magnet assembly of claim 8 wherein said magnet is a molded one-piece disc having a center opening extending through said magnet face.

14. The magnet assembly of claim 8 further comprising a cup-shaped plastic housing protectively covering said outer side and said outer edge of said magnet face.

15. The magnet assembly of claim 8 wherein said inner side of said magnet face is engageable with the outer end wall of the filter housing, further comprising a friction pad insertable between said inner side of said magnet face and the outer end wall of the filter housing.

16. In combination, a filter having a ferrous metal housing through which a fluid is circulated and a magnet assembly comprising a disc shaped magnet having a magnet face, said magnet face having an inner side removably attached to an outer end wall of said filter housing, and a plurality of circumferentially spaced pairs of poles on said magnet face that concentrate the magnetic strength of said magnet on said face and form magnetic loops in said filter housing to cause any ferrous metal particles in the fluid being circulated through said filter housing to be trapped against interior walls of said filter housing.

17. The combination of claim 16 wherein said inner side of said magnet face is shaped to conform to said outer end wall of said filter housing to provide increased surface contact therebetween.

18. The combination of claim 16 wherein said inner side of said magnet face has a conical tapered contour to provide increased surface contact with a rounded concave contour of said outer end wall of said filter housing.

19. The combination of claim 18 wherein said inner side of said magnet face has a 10° conical taper.

20. The combination of claim 16 wherein said magnet face has an outer side opposite said inner side, and a ferrous metal disc is attached to said outer side that aids in focusing magnetic flux of said magnet on said magnet face.

21. The combination of claim 16 wherein said magnet face has an outer side opposite said inner side and an outer edge, further comprising a cup-shaped plastic housing covering said outer side and said outer edge of said magnet face.

* * * * *